United States Patent
Schwartz

(10) Patent No.: US 6,582,510 B1
(45) Date of Patent: Jun. 24, 2003

(54) USE OF COMB-BRANCHED COPOLYMERS AS PIGMENT DISPERSANTS

(75) Inventor: Steven A. Schwartz, Downingtown, PA (US)

(73) Assignee: ARCO Chemical Technology, L.P., Greenville, DE (US)

( * ) Notice: Subject to any disclaimer, the term of this patent is extended or adjusted under 35 U.S.C. 154(b) by 0 days.

(21) Appl. No.: 10/123,683

(22) Filed: Apr. 16, 2002

(51) Int. Cl.[7] .................. C08L 29/10; C09D 11/10; C09D 5/00

(52) U.S. Cl. .................. 106/499; 106/402; 106/413; 106/447; 106/460; 106/465; 106/471; 106/476; 106/487; 106/491; 106/493; 106/494; 106/495; 106/496; 106/497; 106/498; 523/161

(58) Field of Search .................. 106/499, 402, 106/413, 447, 460, 465, 471, 476, 487, 491, 493, 494, 495, 496, 497, 498; 523/161

(56) References Cited

U.S. PATENT DOCUMENTS

| | | | |
|---|---|---|---|
| 5,085,698 A | 2/1992 | Ma et al. | |
| 5,221,334 A | 6/1993 | Ma et al. | |
| 5,231,131 A | 7/1993 | Chu et al. | |
| 5,424,364 A | * 6/1995 | Simms et al. | 525/170 |
| 5,519,085 A | 5/1996 | Ma et al. | |
| 5,830,927 A | 11/1998 | Vanderhoff et al. | |
| 5,880,238 A | 3/1999 | Bafford | |
| 5,998,535 A | 12/1999 | Haldankar | |
| 6,037,414 A | * 3/2000 | Simms et al. | 525/176 |
| 6,046,253 A | 4/2000 | Erdtmann et al. | |
| 6,107,392 A | * 8/2000 | Antonelli et al. | 524/504 |
| 6,433,039 B1 | * 8/2002 | Schwarz | 523/161 |

FOREIGN PATENT DOCUMENTS

| | | |
|---|---|---|
| EP | 0 783 023 A2 | 9/1997 |
| WO | WO 01/10918 A1 | 2/2001 |
| WO | WO 01/44389 A1 | 6/2001 |
| WO | 01/51534 * | 7/2001 |

* cited by examiner

Primary Examiner—Anthony J. Green
(74) Attorney, Agent, or Firm—Brooks & Kushman P.C.

(57) ABSTRACT

A pigment dispersion suitable for use in the manufacture of pigmented coating compositions is provided. The pigment dispersion comprises a) pigment, b) carrier, and c) an acrylic/polyether comb-branched copolymer dispersant wherein the polyether portion of the copolymer is free of any acidic groups. A method of making a present dispersion is also provided. The method comprises mixing together, in any combination: a) pigment, b) carrier, and c) an acrylic/polyether comb-branched copolymer dispersant wherein the polyether portion of the copolymer is free of any acidic groups. A pigmented coating composition is also provided comprising a pigment dispersion made in accordance with present invention.

24 Claims, No Drawings

USE OF COMB-BRANCHED COPOLYMERS AS PIGMENT DISPERSANTS

BACKGROUND OF THE INVENTION

1. Field of the Invention

The present invention relates to the use of comb-branched copolymers as pigment dispersants, and more specifically to pigment dispersions containing pigment, a carrier medium, and a comb-branched copolymer pigment dispersant, and a method for making the pigment dispersions.

2. Background Art

Pigmented coating compositions are used in a wide variety of applications including paints, inks, and varnishes. The preparation of pigmented coating compositions generally involves mixing binder resin(s), crosslinker(s), additives, e.g., flow additives, and solvents with a compatible pigment dispersion. Pigment dispersions are typically prepared by mixing dry pigment (inorganic or organic) with a pigment dispersant in the presence of a carrier medium, e.g., an aqueous carrier such as water, or solvent based carriers.

Dry pigments are available commercially in the form of agglomerated pigment particles. Pigment agglomerates are more likely to settle out of pigment dispersions and/or pigmented coating compositions and are accordingly undesirable. To break the pigment agglomerates down into smaller agglomerates and/or individual particles generally requires a use of energy intensive mixing means (commonly referred to as grinding), e.g., sand mills and ball mills. During the grinding process, the pigment agglomerates are broken down into small agglomerates and/or individual particles the surfaces of which are wetted by the pigment dispersant. Pigment dispersants are provided in the pigment dispersion to suspend or disperse the pigment particles in the carrier medium and prevent their re-agglomeration on storage. It is desirable that the pigment dispersant function to effectively wet, disperse and stabilize both inorganic and organic pigments in either aqueous or non-aqueous solvents.

Some commercially available dispersants may act operatively for the above stated purposes, but disadvantageously create a relatively high amount of foam. In this context, foam is described as a frothy mass of fine bubbles formed in or on the surface of a liquid. A stabilized foam is usually the result of air entrainment in the liquid due to mechanical mixing. The problems of high levels of foam during the dispersion phase can be encountered in both the pre-mix and milling chambers of traditional dispersing equipment. The presence of foam slows down the dispersion process. Foam can also adversely affect film properties of derived coatings such as moisture resistance. In addition to being operable without generating high amounts of foam, suitable dispersants should be capable of forming stable pigment dispersions that have relatively high pigment loading capabilities.

Accordingly, it would be desirable to provide a pigment dispersant that forms the above needed functions of a pigment dispersant and foams less than other prior art dispersants.

SUMMARY OF THE INVENTION

It has now been surprisingly discovered that the above and other objectives can be met by providing a dispersant comprising an acrylic/polyether comb-branched copolymer.

It has been further surprisingly discovered that very stable dispersions having a dispersant comprising an acrylic/polyether comb-branched copolymer have relatively low foaming.

Accordingly, the present invention comprises a stable, low foaming dispersion comprising: a) pigment; b) carrier; and c) an acrylic/polyether comb-branched copolymer dispersant wherein the polyether portion of the copolymer is free of any acidic groups.

Moreover, the present invention comprises a method of making a dispersion suitable for use in pigmented coating compositions. The method includes mixing together, in any combination: a) pigment; b) carrier; and c) an acrylic/polyether comb-branched copolymer dispersant wherein the polyether portion of the copolymer is free of any acidic groups.

Furthermore, the present invention comprises a pigment coating composition comprising the dispersion described above.

DETAILED DESCRIPTION OF THE PREFERRED EMBODIMENT(S)

Dispersions made in accordance with the present invention comprise, at a minimum pigment, carrier, and a dispersant comprising an acrylic/polyether comb-branched copolymer.

The acrylic/polyether comb-branched copolymer preferably has a molecular weight of 400 grams per mole to about 1,000,000 grams per mole, more preferably between about 600 grams per mole to about 800,000 grams per mole, and most preferably between about 1,000 grams per mole to about 600,000 grams per mole. The copolymer preferably has a mole ratio of acrylic monomer units to polyether units of about 1/99 to about 99/1, more preferably from about 1/1 to about 20/1, and most preferably from about 2/1 to about 20/1. The pendant polyether chain of the copolymer is free of any acidic groups, preferably free of any ionic groups, and more preferably free of any phosphate groups.

The comb-branched copolymer can be made by any suitable process for copolymerizing acrylic units with polyether units. In one preferred method, the copolymer is formed by reacting a polyether polymer or macromonomer with a polyacrylic acid polymer or acrylic monomer. The process may be continuous, batch, or semi-batch. Following the copolymerization process, any relatively volatile unreacted monomers are generally stripped from the product.

More preferably, the comb-branched copolymer is made according to one of the three following processes. The first process (i) comprises copolymerizing an unsaturated polyether macromonomer with at least one ethylenically unsaturated comonomer selected from the group consisting of carboxylic acids, carboxylic acid salts, hydroxyalkyl esters of carboxylic acids, and carboxylic acid anhydrides. The second process (ii) comprises reacting a carboxylic acid polymer and (a) a polyether prepared by polymerizing a $C_2$–$C_4$ epoxide or (b) a polyether mixture comprising (1) a monofunctional polyether prepared by polymerizing a first epoxide selected from the group consisting of $C_2$–$C_4$ epoxides and mixtures thereof onto a monofunctional initiator and (2) a difunctional polyether prepared by polymerizing a second epoxide selected from the group consisting of $C_2$–$C_4$ epoxides and mixtures thereof, which may be the same as or different from the first epoxide, onto a difunctional initiator wherein the carboxylic acid polymer and the polyethers are reacted under conditions effective to achieve partial cleavage of the polyether and esterification of the polyether and cleavage products thereof by the carboxylic acid polymer. The third process (iii) comprises polymerizing a polymerizable acid monomer containing at least one ethylenically unsaturated group in conjugation with a carboxyl group selected from the group consisting of carboxylic acid, carboxylic anhydride and carboxylic ester groups in a reaction medium comprising a polyether, wherein the polyether is prepared by polymerizing a $C_2$–$C_4$ epoxide, to form a carboxylic acid polymer; and reacting the carboxylic acid polymer and the polyether under conditions effective to achieve esterification of the polyether by the carboxylic acid polymer to form the comb-branched copolymer.

The preferred polyether macromonomer preferably comprises ethylene oxide and propylene oxide and has a molecular weight of about 300 grams per mole to about 100,000 grams per mole, more preferably between about 500 grams per mole to about 75,000 grams per mole, and most preferably between about 1,000 grams per mole to about 10,000 grams per mole. All molecular weights are number average molecular weights unless stated otherwise. Preferably, the ratio of propylene oxide (PO) to ethylene oxide (EO) of the polyether polymer or polyether macromonomer is between about 99/1 to about 1/99, more preferably between about 95/5 to about 1/99, and even more preferably between about 80/20 to about 1/99 by weight, and most preferably between about 50/50 to about 30/70.

A preferred process for making the copolymer comprises: (a) forming a monomer stream, an initiator stream, and an optional chain transfer agent stream; (b) polymerizing the streams in a reaction zone at a temperature within the range of about −20° C. to about 150° C.; and (c) withdrawing a polymer stream from the reaction zone. This process is described in more detail in copending U.S. patent application Ser. No. 09/358,009, filed Jul. 21, 1999, now U.S. Pat. No. 6,214,958, which is incorporated herein by reference.

The monomer stream contains an acrylic monomer and a polyether macromonomer. Suitable acrylic monomers are derived from acrylic acid and methacrylic acid. Preferred acrylic monomers include acrylic acid, methacrylic acid, their ammonium and alkali metal salts, their $C_1$ to $C_{10}$ alkyl and $C_6$ to $C_{12}$ aryl esters, and their amides. Acrylic acid, methacrylic acid, ammonium acrylate, ammonium methacrylate, sodium acrylate, sodium methacrylate, potassium acrylate, and potassium methacrylate are preferred. Most preferred are acrylic acid and methacrylic acid.

Suitable polyether macromonomers have a polyether chain and a single carbon-carbon double bond, which can be located either terminally or within the polyether chain. Examples include polyether monoacrylates, polyether monomethacrylates, polyether monoallyl ethers, polyether monomaleates, and polyether monofumarates. Further examples include the reaction product of a hydroxyl-functional polyether with isocyanatoalkyl(meth)acrylates such as isocyanatoethylacrylate, and with ethylenically unsaturated aryl isocyanates. The polyether of the macromonomer is an alkylene oxide polymer having a number average molecular weight within the range of about 500 to about 10,000. Suitable alkylene oxides include ethylene oxide, propylene oxide, butylene oxide, and the like, and mixtures thereof. The polyether macromonomers preferably have hydroxyl functionality from 0 to 5. They can be either linear or branched polymers, homopolymers or copolymers, random or block copolymers, diblock or multiple-block copolymers.

Examples of polyether macromonomers are poly(propylene glycol) acrylates or methacrylates, poly(ethylene glycol) acrylates or methacrylates, poly(ethylene glycol) methyl ether acrylates or methacrylates, acrylates or methacrylates of an oxyethylene and oxypropylene block or random copolymer, poly(propylene glycol) allyl ether, poly(ethylene glycol) allyl ether, poly(propylene glycol) monomaleate, and the like, and mixtures thereof. Preferred polyether macromonomers are poly(propylene glycol) acrylates or methacrylates, poly(ethylene glycol) acrylates or methacrylates, acrylates or methacrylates of an oxyethylene and oxypropylene block and/or random copolymer. More preferred are acrylates or methacrylates of an oxyethylene and oxypropylene block and/or random copolymer.

The ratio of acrylic monomer to polyether macromonomer is determined by many factors within the skilled person's discretion, including the required physical properties of the comb-branched copolymer, the selection of the acrylic monomer, and the properties of the polyether macromonomer. The ratio generally is within the range from 1/99 to 99/1 by weight. The preferred range is from 5/95 to 75/25.

In one embodiment, the macromonomer is made by (a) oxyalkylating an initiator molecule selected from the group consisting of hydroxyalkyl acrylates, hydroxyalkyl methacrylates, and monounsaturated monocarboxylic acids with an alkylene oxide in the presence of an effective amount of a double metal cyanide complex catalyst under conditions effective to form a well-defined unsaturated macromonomer having a terminal hydroxyl functionality and not more than substantially one initiator molecule per unsaturated macromonomer molecule. This method is described in substantial detail in U.S. Pat. No. 6,034,208, which is incorporated herein by reference. Also, the macromonomer described in U.S. Pat. No. 6,034,208 in addition to being reacted in the manner described in the preferred continuous process described herein, can be reacted with the comonomer in the manner described in U.S. Pat. No. 6,034,208.

Optionally, the monomer stream contains a third monomer. The third monomer is preferably selected from vinyl aromatics, vinyl halides, vinyl ethers, vinyl esters, vinyl pyrrolidinones, conjugated dienes, unsaturated sulfonic acids, unsaturated phosphonic acids, and the like, and mixtures thereof. The amount of third monomer used depends on the required physical properties of the comb-branched copolymer product, but is preferably less than 50% by weight of the total amount of monomers.

Optionally, the monomer stream also includes a solvent. The solvent is used to dissolve the monomer, to assist heat transfer of the polymerization, or to reduce the viscosity of the final product. The solvent is preferably selected from water, alcohols, ethers, esters, ketones, aliphatic hydrocarbons, aromatic hydrocarbons, halides, and the like, and mixtures thereof. Selections of solvent type and amount are determined by the polymerization conditions including reaction temperature. Water and alcohols, such as methanol, ethanol, and isopropanol are preferred.

The initiator stream contains a free radical initiator. The initiator is preferably selected from persulfates, hydrogen peroxide, organic peroxides and hydroperoxides, azo compounds, and redox initiators such as hydrogen peroxide plus ferrous ion. Persulfates, such as ammonium and potassium persulfate, are preferred.

Optionally, the initiator stream contains a solvent. The solvent is used to dissolve or dilute the initiator, to control the polymerization rate, or to aid heat or mass transfer of the polymerization. Selections of solvent type and amount are determined by the nature of the initiator and the polymerization conditions. Water and alcohols such as methanol, ethanol, and isopropanol are preferred when persulfate is used as the initiator.

The monomer and initiator streams optionally include a chain transfer agent. Suitable chain transfer agents include alkyliodides and bromides, branched lower alcohols such as isopropanol, alkyl amines, alkyl sulfides, alkyl disulfides, carbon tetrahalides, allyl ethers, and mercaptans. Mercaptans, such as dodecyl mercaptan, butyl mercaptan, mercaptoacetic and mercaptopropionic acids, are preferred.

Under some conditions, it is preferred to add the chain transfer agent in a separate stream. This is particularly desirable when the chain transfer agent causes decomposition of the initiator or polymerization of the monomer once it is mixed with those components. This is particularly important in a large, commercial scale because these reactions can cause safety problems.

Optionally, the chain transfer agent stream contains a solvent that is used to dissolve or dilute the chain transfer agent. Suitable solvents include water, alcohols, ethers, esters, ketones, aliphatic and aromatic hydrocarbons, halides, and the like, and mixtures thereof. Selections of solvent type and amount are determined by the nature of the chain transfer agent and the polymerization conditions. Water and alcohols, such as methanol, ethanol, and isopropanol, are preferred.

The monomer stream, initiator stream, and optional chain transfer agent stream are polymerized in a reaction zone. The reaction temperature is preferably kept essentially constant during the polymerization. The temperature is determined by a combination of factors including the desired molecular weight of the comb-branched polymer product, the initiator type and concentration, the monomer type and concentration, and the solvent used. The reaction is performed at a temperature within the range of about −20° C. to about 150° C., preferably, within the range of about 20° C. to about 90° C. Most preferred is the range of about 40° C. to about 60° C.

The addition rate of each stream depends on the desired concentration of each component, the size and shape of the reaction zone, the reaction temperature, and many other considerations. In general, the streams flow into the reaction zone at rates that keep the initiator concentration within the range of about 0.01% to about 1% by weight, and the chain transfer agent concentration within the range of about 0.1% to about 1.5% by weight.

The reaction zone is where the polymerization takes place. It can be in the form of a tank reactor, a tubular reactor, or any other desirably shaped reactor. The reaction zone is preferably equipped with a mixer, a heat transfer device, an inert gas source, and any other suitable equipment.

As the streams are polymerized in the reaction zone, a polymer stream is withdrawn. The flow rate of the polymer stream is such that the reaction zone is mass-balanced, meaning that the amount of material that flows into the reaction zone is equal to the amount of material withdrawn from the reaction zone. The polymer stream is then collected.

The comb-branched copolymer may also be made according to a multiple-zone process. A multiple-zone process is similar to the process discussed above except that more than one reaction zone is used. In a multiple-zone process, a first polymer stream is withdrawn from a first reaction zone and transferred into a second reaction zone where the polymerization continues. A second polymer stream is withdrawn from the second reaction zone. More than two reaction zones can be used if desirable. The reaction temperature in the second reaction zone can be the same as or different from the first reaction zone. A multiple-zone process can enhance monomer conversion and increase efficiency of the process.

Usually, in the first polymer stream, the monomer conversion is within the range of about 65% to 85% by weight. The second reaction zone preferably brings the monomer conversion to 90% or greater.

In a second preferred process, the comb-branched copolymer used in accordance with the present invention can be made by reacting (a) a carboxylic acid polymer and (b) a polyether macromonomer prepared by polymerizing a $C_2$–$C_4$ epoxide or (c) a polyether mixture comprising (1) a monofunctional polyether prepared by polymerizing a first epoxide selected from the group consisting of $C_2$–$C_4$ epoxides and mixtures thereof onto a monofunctional initiator and (2) a difunctional polyether prepared by polymerizing a second epoxide selected from the group consisting of $C_2$–$C_4$ epoxides and mixtures thereof, which may be the same as or different from the first epoxide, onto a difunctional initiator wherein the carboxylic acid polymer and the polyethers are reacted under conditions effective to achieve partial cleavage of the polyether and esterification of the polyether and cleavage products thereof by the carboxylic acid polymer. These methods are described in substantial detail in U.S. Pat. Nos. 5,614,017 and 5,670,578 which are incorporated herein by reference.

In a third preferred process, the comb-branched copolymer used in accordance with the present invention can be made by polymerizing a polymerizable acid monomer containing at least one ethylenically unsaturated group in conjugation with a carboxyl group selected from the group consisting of carboxylic acid, carboxylic anhydride and carboxylic ester groups in a reaction medium comprising a polyether, wherein the polyether is prepared by polymerizing a $C_2$–$C_4$ epoxide, to form a carboxylic acid polymer; and reacting the carboxylic acid polymer and the polyether under conditions effective to achieve esterification of the polyether by the carboxylic acid polymer to form the comb-branched copolymer. This method is described in substantial detail in U.S. Pat. No. 5,985,989 which is incorporated herein by reference.

The dispersant is typically present in the pigment dispersion of the present invention in an amount of at least 0.02 percent by weight, preferably at least 0.05 percent by weight, and more preferably at least 0.1 percent by weight, based on the total weight of the pigment. The dispersant is also typically present in the dispersion in an amount of less than 65 percent by weight, preferably less than 40 percent by weight, and more preferably less than 30 percent by weight, based on the total weight of the pigment. The amount of dispersant present in the dispersion of the present invention may range between any combination of these values, inclusive of the recited values.

The pigment of the dispersion of the present invention may be selected from inorganic pigments (such as carbon black pigments, e.g., furnace blacks, electrically conductive carbon black pigments, extender pigments and corrosion inhibitive pigments); organic pigments; dispersed dyes; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbozole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxides, yellow iron oxides, black iron oxides and transparent iron oxides. Extender pigments that may be present in the pigment dispersion include, but are not limited to, silicas, clays, alkaline earth metal sulfates and carbonates, such as calcium sulfate, magnesium sulfate, barium sulfate, and calcium carbonate. The pigment dispersion may contain corrosion inhibitive pigments, such as aluminum phosphate and calcium modified silica.

The pigment is typically present in the dispersion of the present invention in an amount of at least 0.5 percent by weight, more typically at least 5 by weight, and even more typically at least 20 percent by weight, based on the total weight of the dispersion. While the pigment loading could preferably be even higher, the pigment is also typically present in the dispersion in an amount of less than 95 percent by weight, more typically less than 90 percent by weight, and even more typically less than 75 percent by weight, based on the total weight of the dispersion. The amount of pigment present in the dispersion may range between any combination of these values inclusive of the recited values.

The pigment and dispersant are typically present together in the dispersion in an amount totaling from 0.5 percent by weight to 95 percent by weight, more typically from 5 percent by weight to 95 percent by weight, and most typically from 10 percent by weight to 95 percent by weight, based on the total weight of the dispersion. The percent weights are based on the total combined weight of the pigment and dispersant. The weight ratio of pigment to dispersant is typically from 1.5/1 to 5,000/1, more typically from 2.5/1 to 2,000/1, or most typically from 3.3/1 to 1,000/1.

The dispersion of the present invention also comprises a carrier selected from water, organic solvent, and a mixture of water and at least one organic solvent (preferably a water soluble organic solvent). Suitable classes of organic solvents that may be used include, but are not limited to, alcohols, e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl-2,4-pentanediol and 1,2,6-hexanetriol; hydroxy functional ethers of alkylene glycols, e.g., butyl 2-hydroxethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds such as thioglycol, dimethyl sulfoxide and tetramethylene sulfone.

When the carrier comprises a mixture of water and organic solvent, the aqueous carrier typically contains from 30 to 95 percent by weight of water, and from 5 to 70 percent by weight of organic solvent, e.g., from 60 to 95percent by weight of water, and from 5 to 40percent by weight of organic solvent. The percent weights are based on the total weight of the aqueous carrier.

The carrier is typically present in the dispersion of the present invention, in an amount of at least 5 percent by weight, more typically at least 10 percent by weight, and even more typically at least 15 percent by weight, based on the total weight of the dispersion. The carrier is also typically present in the dispersion in an amount of less than 99.5 percent by weight, and more typically less than 95 percent by weight, based on the total weight of the dispersion.

The dispersants of the present invention are especially suitable for preparing pigment dispersions by conventional dispersion techniques well known in the art such as roller mills, ball mills, Cowles dissolver, sand mills and others. The pigment is added to the dispersant, in the presence of a suitable liquid carrier, which may be a solvent, a reactive diluent or even another polymer so that the pigment dispersion has an appropriate viscosity for grinding and dispersing the pigment and maintaining it in a stable dispersed state. The polymeric dispersants of this invention allow pigments to be more readily dispersed in pigment grinds, without the need to use any other surfactant.

The pigment dispersions can contain other additives commonly used in pigment dispersions, for example, plasticizers, wetting agents, defoamers, diluents, and flow control agents.

The dispersants of the present invention contribute to pigment dispersions that are stable, have good color properties and have relatively high pigment loading capabilities.

The dispersion of the present invention is useful in the preparation of, for example, coating compositions, such as, paints, inks, and varnishes.

The following examples merely illustrate the present invention. Those skilled in the art will recognize many variations that are within the spirit of the present invention and scope of the claims.

EXAMPLE 1

Preparation of Comb-Branched Copolymer By Continuous Process

A polyether macromonomer that is an acrylate of oxyethylene/oxypropylene random copolymer having oxyethylene/oxypropylene ratio 50/50 by weight and number average molecular weight $M_n$ of 2,000 (122.5 g, 0.0613 mole) that is made in accordance with the process described in U.S. Pat. No. 6,034,208, acrylic acid (17.6 g, 0.245 mole), mercaptopropionic acid (1.2 g) and ammonium persulfate (0.70 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Additional polyether macromonomer (245 g, 0.123 mole), made in the same manner described above, acrylic acid (35.4 g, 0.492 mole), mercaptopropionic acid (2.6 g) and deionized water (DI water) (145 g) are then mixed. The mixture is purged with $N_2$ for 20 minutes and the charged into the monomer pump. Ammonium persulfate (1.4 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 gram/min and 0.33 gram/min, respectively. The product is continuously withdrawn from the reactor at a rate of 1.33 gram/min. It has a number average molecular weight $M_n$: 32,000, and molecular weight distribution $M_w/M_n$: 1.30.

EXAMPLE 2

Preparation of Comb-Branched Copolymer By Continuous Process

A polyether macromonomer that is an acrylate of oxyethylene/oxypropylene random copolymer having oxyethylene/oxypropylene ratio 70/30 by weight and number average molecular weight $M_n$ of 3,000 (122.5 g, 0.0408 mole) made in accordance with the process described in U.S. Pat. No. 6,034,208, acrylic acid (17.6 g, 0.245 mole), mercaptopropionic acid (1.2 g) and ammonium persulfate (0.70 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Additional polyether macromonomer (245 g, 0.0817 mole), made in the same manner described above, acrylic acid (35.4 g, 0.492 mole), mercaptopropionic acid (2.6 g) and deionized water (DI water) (145 g) are mixed. The mixture is purged with $N_2$ for 20 minutes and the charged into the monomer pump. Ammonium persulfate (1.4 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 gram/min and 0.33 gram/min, respectively. The product is continuously withdrawn from the reactor at a rate of 1.33 gram/min. It has a number average molecular weight $M_n$: 45,000, and molecular weight distribution $M_w/M_n$: 1.42.

EXAMPLE 3

Preparation of Comb-Branched Copolymer By Continuous Process

A polyether macromonomer that is an acrylate of oxyethylene/oxypropylene random copolymer having oxyethylene/oxypropylene ratio 70/30 by weight and number average molecular weight $M_n$ of 3,000 (122.5 g, 0.0350 mole) made in accordance with the process described in U.S. Pat. No. 6,034,208, acrylic acid (17.6 g, 0.245 mole), mercaptopropionic acid (1.7 g) and ammonium persulfate (1.3 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Additional polyether macromonomer (245 g, 0.0700 mole), made in the same manner described above, acrylic acid (35.4 g, 0.492 mole), mercaptopropionic acid (3.6 g) and deionized water (DI water) (145 g) are mixed. The mixture is purged with $N_2$ for 20 minutes and the charged into the monomer pump. Ammonium persulfate (2.6 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 gram/min and 0.33 gram/min, respectively. The product is continuously withdrawn from the reactor at a rate of 1.33 gram/min. It has a number average molecular weight $M_n$: 80,000, and molecular weight distribution $M_w/M_n$: 1.48.

EXAMPLE 4

Dispersant Foaming Tendencies

The degree of foaming (air entrainment) and foam stability were assessed for the comb copolymer dispersant of the present invention and compared against commercial copolymer dispersants (Disperbyk® -190 (BYK-Chemie USA, Wallingford Conn.); EFKA-4550 (EFKA Additives USA, Stow, Ohio)). Aqueous solutions of the dispersant polymers were vigorously mixed, and the volumes of the foams that were produced and their subsequent dissipation were measured over a fixed time period in accordance with the following procedure.

225 ml of 5 wt. % aqueous solutions of the candidate dispersants in Table 1 below were contained in a 500 ml graduated cylinder and mixed at room temperature using a high speed dispersing device (Dispermat® CV Vertical Dissolver (BYK-Gardner USA, Columbia, Md.)). A 20 mm diameter, light-weight dispersion impeller (Dispermat® DB-1195) was rotated in the polymer solution at 4000 rpm for ten minutes. The volumes of the foam produced were observed and measured in the graduated cylinder after the mixing period was complete. Table 1 below shows that the comb copolymer dispersant of the present invention had a much lower foaming tendency and that the foam completely collapsed 10 minutes after the mixing was completed.

TABLE 1

| Dispersant | Initial Foam Volume (ml) | Foam Volume (ml) after 5 min | Foam Volume (ml) after 10 min |
|---|---|---|---|
| Copolymer of Example 1 | 7 | 5 | 0 |
| Disperbyk ®-190 | 47 | 45 | 19 |
| EFKA-4550 | 42 | 37 | 22 |

A dispersant polymer with low foaming tendency is key to the formulation of pigments into stable concentrates with good dispersion characteristics. Foaming critically affects processability in terms of ease of use and productivity; it slows down the dispersion process. Foam also affects performance of the resultant coatings in terms of undesirable viscosity increase, moisture resistance, and poor optical properties (e.g., pinholes).

EXAMPLE 5

Aqueous Organic Pigment Dispersion

Aqueous organic pigment dispersions were prepared by combining phthalocyanine blue pigment powder (Color Index Name: Pigment Blue 15:3; Color Index Number: 74160; CAS Registry Number: 147-14-8; copper phthalocyanine beta modification, Cleveland Pigment and Color Co., Akron, Ohio) into an aqueous solution of the comb copolymer dispersant of Example 2 in accordance with the following procedure.

Into a 250 ml stainless steel, single wall beaker containing 150 g of an 11.3 wt. % aqueous solution of the comb copolymer of Example 2, 100 g of the dry blue pigment was slowly added. A resulting predispersion was achieved by mixing with a high speed dispersing device (Dispermat® CV Vertical Dissolver (BYK-Gardner USA, Columbia, Md.)). A 20 mm diameter, light-weight dispersion impeller (Dispermat® DB-1195) was rotated in the polymer solution at 4000 rpm for fifteen minutes.

The predispersion was immediately transferred to a Netzsch Agitator Bead Mill (Model LMZ 0.3E Zeta System, Netzsch, Inc. Exton, Pa.) that was charged with 200 ml of 0.8 to 1.0 mm diameter zirconium/silica ceramic beads (SEPR ER120S, SEPR Ceramic Beads and Powders, Mountainside, N.J.). Continuous grinding and dispersion was achieved via multiple passing at an agitator rpm of 3500.

The material flowing through the bead mill was sampled over specified time intervals. Particle size and rheology measurements on the samples were performed that demonstrate that the comb copolymer dispersant of the present invention enabled production of stable aqueous pigment dispersions.

Particle size analysis was performed using a Horiba LA900 Laser Light Scatteing Particle Size Analyzer. Table 2 below shows the reduction in particle size and the tendency towards a narrow, monodisperse particle size distribution which is evidence of a good pigment dispersion.

TABLE 2

Particle Size Analysis
Aqueous Organic Pigment Dispersion
40 wt. % Pigment Blue 15:3 in water;
16.9 wt. % (based on total pigment)
comb copolymer dispersant of Example 2

| | Particle Diameter Distribution | | | | | |
|---|---|---|---|---|---|---|
| milling time (min) | <1.000 μm (%) | <0.500 μm (%) | <0.300 μm (%) | <0.200 μm (%) | <0.100 μm (%) | Mean (μm) |
| 10 | 91.5 | 89.7 | 83.4 | 33.8 | 0 | 0.363 |
| 30 | 99.2 | 97.9 | 91.9 | 50.1 | 0 | 0.222 |
| 90 | 100 | 100 | 96.7 | 57.1 | 0 | 0.198 |

Flow curves of the aqueous organic pigment dispersions containing comb copolymer dispersants were collected using a TA Instruments $CSL^2$ Controlled Stress Rheometer (TA Instruments, New Castle, Del.) in the flow mode. The samples were sheared over a range between 0 and 300/s between a cone and plate geometry at 20° C. Shear stress was plotted against shear rate, and the flow curves were fit to the well-known Power Law Model ($\tau=k\omega^n$), where $\tau$ is the shear stress, $\omega$ is the shear rate, k is the consistency and n is the rate index). The results are shown below in Table 3. The increase in k and the decrease in n with increasing milling time indicate increased viscosity and shear-thinning behavior. This is rheological evidence of the production of a good pigment dispersion consisting of a network of successively smaller pigment particles.

TABLE 3

Rheological Analysis-Power Law Fit ($\tau = k\omega^n$) to Experimental Flow Curves Aqueous Organic Pigment Dispersion
40 wt. % Pigment Blue 15:3 in water; 16.9 wt. % (based on total pigment) comb copolymer dispersant of Example 2

| | Power Law Constants | |
|---|---|---|
| milling time (min) | k (Pa s) | n |
| 30 | 0.07 | 0.90 |
| 45 | 0.12 | 0.83 |
| 60 | 0.15 | 0.82 |
| 90 | 0.44 | 0.64 |

Flow curves were also obtained for the pigment dispersions after they were allowed to age at room temperature. The negligible deviations in viscosity as a function of aging time, as shown below in Table 4, demonstrate the production of stable pigment dispersions.

TABLE 4

Viscosity Stability
Aqueous Organic Pigment Dispersion-60 minutes milling time
40 wt. % Pigment Blue 15:3 in water; 16.9 wt. % (based on total pigment) comb copolymer dispersant

| shear rate (l/s) | viscosity (mPa s) 5 days aging | viscosity (mPa s) 6 weeks aging |
|---|---|---|
| 10 | 80 | 80 |
| 20 | 75 | 75 |
| 50 | 64 | 68 |
| 100 | 58 | 61 |

Longer term stability was measured for dispersions that were aged at room temperature for about nine months. The resistance of the pigment in the dispersions to gravitational settling (due to agglomeration and aggregation of primary pigment particles) is an indication of the stability. Evidence of settling was determined by measuring the level of pigment solids in the supernatant phase of the pigment concentrates that were stored unperturbed for the aging period. The properties of the supernatant phases of the unperturbed pigment concentrates were then compared to these identical samples except that they were sampled following vigorous agitation. This agitation allowed for redistribution of the precipitated pigment material into the bulk of the fluid. Hence, small differences in the measured solids levels and color development properties between the unperturbed supernatant and the redispersed fluids are an indication of dispersion stability.

Table 5 below shows that the comb copolymer dispersant of the present invention produces dispersions with better storage stability characteristics than those prepared with commercial copolymer dispersants.

TABLE 5

Aqueous Organic Pigment Dispersions (Pigment Blue 15:3 in Water)-
60 Minutes Milling Time
16.9 wt. % (based on total pigment) Copolymer Dispersant

| | Weight % Solids | | |
|---|---|---|---|
| | Disberbyk 190 | Efka 4550 | Copolymer of Example 2 |
| Unshaken Supernatant | 25 | 19 | 35 |
| Restirred Concentrate | 35 | 34 | 35 |

When a pigment dispersion is produced, it is important that it is stable until the time it is utilized. Pigment settling is unacceptable to the user.

EXAMPLE 6

Performance of Aqueous Organic Pigment Dispersion in Paint

Sample paints were prepared by dilution of the aqueous organic pigment dispersions (described in Example 5) with 100% acrylic latex (white) tint base (Sherwin Williams Interior Regular White Semi-Gloss Latex). 5 parts of the pigment dispersion of example 4 and 95 parts of the tint base were hand-mixed and drawn down onto a Form 1A Penopac Paint Test Chart (Leneta Co., Mahwah, N.J.) (using a square multiple clearance applicator (BYK-Gardner, Columbia, Md.)) to a 0.005 inch thick (wet) film.

The dried films were evaluated for color strength development and flocculation stability. Color strength values were obtained by measuring reflectance values in CIELab L* (Commision Internationale D'Eclairage 1976 L* a* b*) using the CIE standard daylight illuminant (D65) with a HunterLab Colorimeter (HunterLab, Reston, Va.). The CIELab color system reports color in terms of two axes a* and b* which are at right angles and represent the hue dimension or color. The third axis is the lightness L*. It is perpendicular to the a*b* plane. Within this system, any color can be specified with the coordinates L*, a*, b*. Alternatively, L*, C*, h° are commonly used. C* (=Chroma) represents the intensity or saturation of the color, whereas the angle h° is another term to express the actual hue.

The stability of the pigment dispersion is reflected in resistance to flocculation, seen as the color/white separation in the paint. The paint was applied by the draw-down technique (low shear) described above, and a drop of the paint was finger-rubbed at high shear (50 circular rubs ~30 seconds after the time of draw-down). The color difference $\Delta E=((\Delta L^*)^2+(\Delta a^*)^2+(\Delta b^*)^2)^{1/2}$ between the drawndown and finger rubbed areas is proportional to the flocculation resistance.

An improvement in color strength with time (decreasing L* values and increasing C* values) indicates that effective pigment dispersion is taking place. In addition, a decreasing value of ΔE indicates a decreasing amount of undesirable instability due to flocculation. These results are shown in Table 6 below for the sample paint containing the comb copolymer pigment dispersion of Example 5 of the present invention.

TABLE 6

Color Strength, Flocculation Stability vs. Milling Time
Interior Latex Paint
5 wt. % Pigment Dispersion (from Example 5)/95 wt. % White Semigloss

| milling time | Color Strength | | Flocculation Stability |
|---|---|---|---|
| (min) | L* | C* | ΔE |
| 10 | 59.86 | 41.13 | 0.85 |
| 30 | 58.97 | 41.44 | 0.77 |
| 45 | 58.56 | 41.71 | 0.73 |
| 60 | 58.37 | 41.91 | 0.73 |
| 90 | 58.10 | 41.85 | 0.60 |

EXAMPLE 7

Performance of Aqueous Organic Pigment Dispersion in Printing Ink

A water-based flexible ink formulation was prepared by sequential addition of the following ingredients:

| Ingredient | Parts by Weight |
|---|---|
| Lucidene 5040[1] | 64 |
| Pigment Dispersion from Example 5 | 22 |
| Jonwax 26[2] | 4 |
| Water | 10 |
| Byk-024[3] | 0.08 |

Lucidene 5040[1]-water-based polymer, Morton International, Inc., Chicago, IL
Jonwax 26[2]-polyethylene wax, SC Johnson Polymer, Sturtevant, WI
Byk-024[3]-defoamer, BYK-Chemie USA, Wallingford CT The composition was hand-mixed and drawn down onto a Form 1A Penopac Paint Test Chart (Leneta Co., Mahwah, N.J.) (using a square multiple clearance applicator (BYK-Gardner, Columbia, Md.)) to a 0.010 inch thick (wet) film.

The dried films were evaluated for gloss using a micro-TRI-glossmeter (BYK-Gardner, Columbia, Md.) and an illumination/detection angle of 60°. The effectiveness of the pigment dispersion of Example 5 containing the comb-branched copolymer of Example 2 of the present invention is evident from the increasing values for gloss as shown in Table 7 below. Smaller stable pigment particles provide more light-reflecting surfaces and hence contribute more to gloss than do large, poorly dispersed, aggregated pigment materials with an associated reduced surface area.

TABLE 7

60° Gloss vs. Milling Time
Aqueous Printing Ink Formulation

| milling time (min) | 60° Gloss |
|---|---|
| 10 | 61.93 |
| 30 | 67.10 |
| 45 | 70.83 |
| 60 | 69.43 |
| 90 | 73.47 |

EXAMPLE 8

Aqueous Organic Pigment Dispersion

Aqueous organic pigment dispersions were prepared by combining carbon black pigment powder (Regal 660, Cabot Corporation, Billerica, Mass.) into aqueous solutions of the comb copolymer dispersants of Examples 1 and 2.

The dispersions were milled using a 50 ml capacity horizontal bead mill (Eigermill M50) charged with 35 ml of zirconium silicate beads for 40 minutes at 3000 rpm. A pre-mix was first produced by mixing the materials on a high shear blade stirrer to produce a homogeneous mixture, before transferring to the mill.

A series of dispersions were made up with each dispersant, using 15% pigment and a range of dispersant concentrations. The remainder of the formulation was water. At low dispersant concentrations the dispersions were thixotropic and often difficult to mill. However, when the optimum level was reached the dispersions were non-thixotropic and had a stable viscosity. Table 8 below shows the effect of dispersant on viscosity for the comb copolymer of Example 1.

TABLE 8

| % Dispersant (solids) on Pigment | Viscosity, cPs (25° C.) | Observations |
|---|---|---|
| 5 | Unmeasurable (>2000) | Extremely viscous when HSHS (high speed high shear) mixed, unmillable (too viscous). |
| 10 | Unmeasurable (>2000) | Extremely viscous when HSHS mixed, unmillable (too viscous). |
| 15 | Unmeasurable (>2000) | Low viscosity when HSHS mixed. Viscosity increased significantly during milling, but milled OK. Extremely thixotropic-initial reading on viscometer was ~4 cPs but increased rapidly and became Unmeasurable (>2000 cPs). |
| 17.5 | 2.46 | Stable (non-thixotropic) |
| 20 | 2.70 | Stable (non-thixotropic) |

TABLE 8-continued

| % Dispersant (solids) on Pigment | Viscosity, cPs (25° C.) | Observations |
|---|---|---|
| 40 | 3.79 | Stable (non-thixotropic) |
| 55 | 5.15 | Stable (non-thixotropic) |
| 70 | 6.14 | Stable (non-thixotropic) |

Viscosities at the optimum dispersant levels are very low—ideal for inkjet compositions. The point going from undispersed to dispersed is very sharp and the data suggests an optimum dispersant level of about 17.5%.

Identical experiments were carried out for the comb copolymer of Example 2 and the table 9 below shows the effect of the dispersant on viscosity.

TABLE 9

| % Dispersant (solids) on Pigment | Viscosity, cPs (25C) | Observations |
|---|---|---|
| 5 | Unmeasurable (>2000) | Extremely viscous when HSHS mixed, unmillable (too viscous). |
| 8 | Unmeasurable (>2000) | Fairly low viscosity when HSHS mixed. Became very viscous after −5 mins milling, and blocked mill. |
| 10 | Unmeasurable (>2000) | Low viscosity when HSHS mixed. Viscosity increased significantly during milling. Extremely thixotropic-initial reading was −4 cPs but increased rapidly to >2000 cPs. |
| 12.5 | 2.69 | Stable (non-thixotropic) |
| 15 | 2.61 | Stable (non-thixotropic) |
| 17.5 | 2.85 | Stable (non-thixotropic) |
| 30 | 3.74 | Stable (non-thixotropic) |
| 35 | 4.29 | Stable (non-thixotropic) |
| 45 | 5.35 | Stable (non-thixotropic) |

As with the copolymer of Example 1, there is a sharp point going from undispersed to dispersed. The data suggests an optimum dispersant level of about 15%.

EXAMPLE 9

Performance of Aqueous Organic Pigment Dispersion in Ink Jet Ink

Inks were prepared from the dispersions described in Example 8 and are shown in table 10 below. The comb copolymer dispersant loadings correspond to those levels that result in the minimum viscosities for the dispersions (17.5 wt. % (based on weight of pigment) for the comb copolymer dispersant of Example 1 and 15 wt. % (based on weight pigment) for the comb copolymer dispersant of Example 2).

TABLE 10

| Raw Material | % Composition (w/w) | |
|---|---|---|
| | Comb Copolymer Dispersant of Example 1 | Comb Copolymer Dispersant of Example 2 |
| Dispersion | 35 | 35 |
| Water | 47.8 | 47.8 |
| Ethylene Glycol | 15 | 15 |
| 2-Pyrollidinone | 2 | 2 |

TABLE 10-continued

| Raw Material | % Composition (w/w) | |
|---|---|---|
| | Comb Copolymer Dispersant of Example 1 | Comb Copolymer Dispersant of Example 2 |
| Tego Flow 425[1] | 0.2 | 0.2 |
| Viscosity, cPs (25° C.) | 2.95 | 2.02 |
| Surface Tension (dyne/cm) | 36.5 | 38.0 |

Tego Flow 425[1]-polyether siloxane copolymer, Goldschmidt Chemical Corporation, Essen, Germany.

While both inks are suitable for ink jet printing, inks made with the comb copolymer dispersant of Example 2 have lower viscosities. This suggest that the dispersant makes better inks due to slightly better compatibility with the materials in the formulation.

EXAMPLE 10

Aqueous Inorganic Pigment Dispersion

Aqueous inorganic pigment dispersions were prepared by combining titanium dioxide pigment powder (Ti-Pure 107, DuPont Corporation, Wilmington, Del.) into aqueous solutions of the comb copolymer dispersants of Examples 1 and 2.

The dispersions were milled using a 50 ml capacity horizontal bead mill (Eigermill M50) charged with 35 ml of zirconium silicate beads for 40 minutes at 3000 rpm. A pre-mix was first produced by mixing the materials on a high shear blade stirrer to produce a homogeneous mixture, before transferring to the mill.

A series of dispersions were made up with each dispersant. A fixed pigment loading of 20 wt. % was used and the level of dispersant was varied. Table 11 below shows the effect of dispersant on viscosity.

TABLE 11

| % Dispersant (solids) on Pigment | Viscosity, cPs (25° C.) | |
|---|---|---|
| | Comb Copolymer of Example 1 | Comb Copolymer of Example 2 |
| 0 | 65 | 65 |
| 0.25 | 1.31 | 1.35 |
| 0.5 | 1.28 | 1.27 |
| 1 | 1.28 | 1.30 |
| 2.5 | 1.37 | 1.41 |
| 5 | 1.49 | 1.56 |
| 10 | 1.65 | 1.89 |
| 20 | 2.14 | 2.75 |

It can be seen that the viscosities suggest optimum dispersant levels of between 0.5 and 1% for both dispersants.

EXAMPLE 11

Performance of Aqueous Inorganic Pigment Dispersion in Ink Jet Ink

Inks were prepared from the dispersions described in Example 10 and are shown in table 12 below. The comb copolymer dispersant loadings are 1.0 wt. % (based on weight of pigment).

TABLE 12

| Raw Material | % Composition (w/w) | |
| --- | --- | --- |
|  | Comb Copolymer Dispersant of Example 1 | Comb Copolymer Dispersant of Example 2 |
| Dispersion | 30 | 30 |
| Water | 52.5 | 52.5 |
| Ethylene Glycol | 15 | 15 |
| 2-Pyrollidinone | 2 | 2 |
| Dynol 604[1] | 0.5 | 0.5 |
| Viscosity, cPs (25° C.) | 1.62 | 1.60 |
| Surface Tension (dyne/cm) | 29.0 | 29.5 |

Dynol 604[1]-non-ionic acetylenic glycol, Air Products Corp., Allentown, PA.

Both inks show good stability with low viscosities and no signs of compatibility problems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pigment dispersion comprising:
   a) pigment;
   b) carrier; and
   c) an acrylic/polyether comb-branched copolymer dispersant wherein the polyether portion is free of any acidic groups.

2. The pigment dispersion of claim 1, wherein the dispersant is present in an effective amount to more fully disperse the pigment in the carrier of the pigment dispersion relative to the level of dispersion of pigment in the carrier of a pigment dispersion not containing the effective amount of the acrylic/polyether comb-branched copolymer dispersant.

3. The pigment dispersion of claim 1, wherein the dispersant is present in the pigment dispersion in an amount of 0.02–65% by weight, based on the total weight of the pigment.

4. The pigment dispersion of claim 1, wherein the weight ratio of pigment to dispersant is from 1.5/1 to 5,000/1.

5. The pigment dispersion of claim 1, wherein the acrylic/polyether comb-branched copolymer dispersant has a molecular weight of 400 to 1,000,000 grams per mole.

6. The pigment dispersion of claim 5, wherein the dispersant has a molar ratio of acrylic monomer units to polyether units of 1/99 to 99/1.

7. The pigment dispersion of claim 6, wherein the dispersant has a molar ratio of acrylic monomer units to polyether units of 1/1 to 20/1.

8. The pigment dispersion of claim 1 wherein the polyether portion of the comb-branched copolymer comprises propylene oxide and ethylene oxide in a ratio of 95/5 to 1/99.

9. The pigment dispersion of claim 8 wherein the polyether portion of the copolymer is free of any ionic groups.

10. The pigment dispersion of claim 8 wherein the polyether portion of the copolymer is free of any phosphate groups.

11. The pigment dispersion of claim 1, wherein the dispersant is present in the dispersion in an amount of 0.02% to 65% by weight, based on the total weight of the dispersion, the pigment is present in an amount of 0.5% to 95% by weight, based on the total weight of the dispersion, and the carrier is present in an amount of 5% to 99.5% by weight, based on the total weight of the dispersion.

12. The pigment dispersion of claim 1, wherein the dispersant is present in an effective amount to provide a first level of pigment dispersion in the carrier of the pigment dispersion, the first level of pigment dispersion being greater than a second level of pigment dispersion in a carrier of a second pigment dispersion not containing at least the effective amount of the acrylic/polyether comb-branched copolymer dispersant.

13. A pigmented composition comprising the pigment dispersion of claim 1.

14. The pigmented composition of claim 13, wherein the pigmented composition comprises a paint.

15. The pigmented composition of claim 13, wherein the pigmented composition comprises an ink.

16. A method of making a pigment dispersion suitable for use in the manufacture of pigmented compositions, said method comprising mixing together, in any combination:
   a) pigment;
   b) carrier; and
   c) an acrylic/polyether comb-branched copolymer dispersant wherein the polyether portion is free of any acidic groups.

17. The method of claim 16, wherein the dispersant is present in an effective amount to more fully disperse the pigment in the carrier of the pigment dispersion relative to the level of dispersion of pigment in the carrier of a pigment dispersion not containing the effective amount of the acrylic/polyether comb-branched copolymer dispersant.

18. The method of claim 16, wherein the dispersant is present in the pigment dispersion in an amount of 0.02–65% by weight, based on the total weight of the pigment.

19. The method of claim 16, wherein the weight ratio of pigment of dispersant is from 1.5/1 to 5,000/1.

20. The method of claim 16, wherein the acrylic/polyether comb-branched copolymer dispersant has a molecular weight of 400 to 1,000,000 grams per mole.

21. The method of claim 20, wherein the dispersant has a molar ratio of acrylic monomer units to polyether units of 1/1 to 20/1.

22. The method of claim 16, wherein the dispersant is present in the dispersion in an amount of 0.02% to 65% by weight, based on the total weight of the dispersion, the pigment is present in an amount of 0.5% to 95% by weight, based on the total weight of the dispersion, and the carrier is present in an amount of 5% to 99.5% by weight, based on the total weight of the dispersion.

23. The method of claim 16, wherein the dispersant is present in an effective amount to provide a first level of pigment dispersion in the carrier of the pigment dispersion, the first level of pigment dispers on being greater than a second level of pigment dispersion in a carrier of a second pigment dispersion not containing at least the effective amount of the acrylic/polyether comb-branched copolymer dispersant.

24. A pigmented composition comprising a pigment dispersion made in accordance with the method of claim 16.

* * * * *